United States Patent
Berndt

(10) Patent No.: US 6,582,519 B1
(45) Date of Patent: Jun. 24, 2003

(54) APPARATUS FOR COATING AN OPTICAL FIBER

(75) Inventor: Jurgen Berndt, Viersen (DE)

(73) Assignee: Alcatel, Paris (FR)

( * ) Notice: Subject to any disclaimer, the term of this patent is extended or adjusted under 35 U.S.C. 154(b) by 143 days.

(21) Appl. No.: 09/401,329

(22) Filed: Sep. 23, 1999

(30) Foreign Application Priority Data

Sep. 25, 1998 (DE) .......................................... 198 44 023

(51) Int. Cl.7 .................................................. B05C 3/12
(52) U.S. Cl. ..................... 118/420; 118/620; 118/642; 118/50.1; 427/163.2
(58) Field of Search ................................. 118/620, 420, 118/622, 423, 642, 325, 50.1; 427/163.2, 498, 501, 508

(56) References Cited

U.S. PATENT DOCUMENTS

| | | | |
|---|---|---|---|
| 4,125,644 A | * 11/1978 | Ketley et al. | 427/36 |
| 4,862,609 A | * 9/1989 | Ullrich et al. | 38/93 |
| 5,482,593 A | * 1/1996 | Kuhn et al. | 156/521 |
| 6,063,450 A | * 5/2000 | Bernert et al. | 427/475 |

* cited by examiner

Primary Examiner—Richard Crispino
Assistant Examiner—Y. T. Tadesse
(74) Attorney, Agent, or Firm—Sughrue Mion, PLLC

(57) ABSTRACT

In an apparatus (4) for coating an optical fiber (3) with an UV curable polymer coating comprising a coating chamber (8) with an intake nozzle (6) and an outlet nozzle (7) for applying the coating to the optical fiber (3) as well as an UV source arranged behind the outlet nozzle, the end face of outlet nozzle (7) facing the UV source is coated with a material (11) that is antiadhesive with respect to the coating material.

5 Claims, 2 Drawing Sheets

APPARATUS FOR COATING AN OPTICAL FIBER

BACKGROUND OF THE INVENTION

The subject of the present invention is an apparatus for coating an optical fiber according to the preamble of claim 1.

To produce an optical fiber, a so-called preform is heated and a fiber is drawn out of it. Directly after this drawing process, the fiber, which is still hot, is cooled in a gas stream.

In the same process step, the cooled fiber is provided with a coating of resin, which is cured in a cross-linking apparatus. Subsequently, the coated fiber is wound onto a coil.

For coating, an apparatus with an intake guide nozzle and an outlet guide nozzle spaced at a distance therefrom is typically used. The space between the intake guide nozzle and the outlet guide nozzle holds the resin. The intake guide nozzle is provided with a bore the diameter of which is only slightly larger than the diameter of the fiber. It essentially serves for precise fiber guidance. The outlet guide nozzle is also provided with a bore the diameter of which is larger than the diameter of the bore in the intake guide nozzle. The resin exits though the gap between the fiber exiting through the outlet guide nozzle and the bore and under normal conditions is deposited on the glass fiber with a coating thickness that is almost uniform over the circumference.

Due to gas bubbles and dirt particles found in the liquid resin, the resin may collect in the areas and the proximity of the bore of the outlet nozzle. It is then uncontrollably detached and carried along by the fast moving fiber. This causes undesirable fluctuations in the outside diameter of the coated fiber. Since the outside diameter of the coated fiber is standardized—as a rule, the outside diameter is 250 $\mu$m—such diameter fluctuations result in non-conforming fibers.

A varnish pool forms below the coating nozzle, particularly as a result of inhomogeneous varnish flow in the coating nozzle channel of the lower coating nozzle, due, for example, to interference on the fiber surface, dirt particles on the fiber or in the varnish, air bubbles or gas bubbles in the varnish, etc. This initiates an inhomogeneous "pump effect" in the nozzle channel that leads to an outflow of excess varnish on the underside of the coating nozzle. With each new pump effect due to interference, the deposited varnish amount increases and accumulates to form a ring shaped varnish pool. As this pool increases in size, it becomes statically less and less stable and is partially carried along again by the passing fiber. The diameter increases abruptly, which leads to unusable fibers.

Until now, the outlet nozzle had to be replaced and cleaned after a certain time. This has the disadvantage that the production process has to be interrupted. It was furthermore time-consuming to install the newly inserted outlet nozzle so that it was aligned with the bore of the intake nozzle.

To solve this problem, EP 0858 977 A1 proposes to provide an exchangeable cartridge in which the intake nozzle and the outlet nozzle are replaceably arranged. In the event of a fault or as a preventive measure after a certain production period, the entire cartridge is replaced and cleaned. With this solution, too, an interruption of the production process is unavoidable.

SUMMARY OF THE INVENTION

Thus, the object of the invention is to define an apparatus that can be used to coat an optical fiber with at least one coating of uniform wall thickness, whereby the apparatus essentially excludes an interruption in production due to fluctuations in the wall thickness or the outside diameter.

This object is attained by the features set forth in the characteristic part of claim 1.

Additional advantageous embodiments of the invention are set forth in the subclaims.

Coating the end face of the outlet nozzle on its outlet side prevents a ring-symmetrical varnish pool from forming there as a result of dust particles or gas bubbles.

The poor wettability due to the non-polar coating materials prevents the varnish from flowing out on the underside of the nozzle. As a result, the varnish cannot collect into larger critical varnish accumulations due to the pump effect. The fiber itself directly transports excess varnish in non-critical amounts and any changes in the diameter remain within tolerance.

Furthermore, partial or full curing of the varnish by the UV sources located below the coating nozzle is avoided. Stray UV rays are always present and would cause cross-linking reactions in the varnish pool, which can result in further problems.

BRIEF DESCRIPTION OF THE DRAWINGS

The invention is further explained by means of the exemplary embodiments schematically depicted in FIGS. 1 and 2.

DETAILED DESCRIPTION OF THE INVENTION

Figure 1:
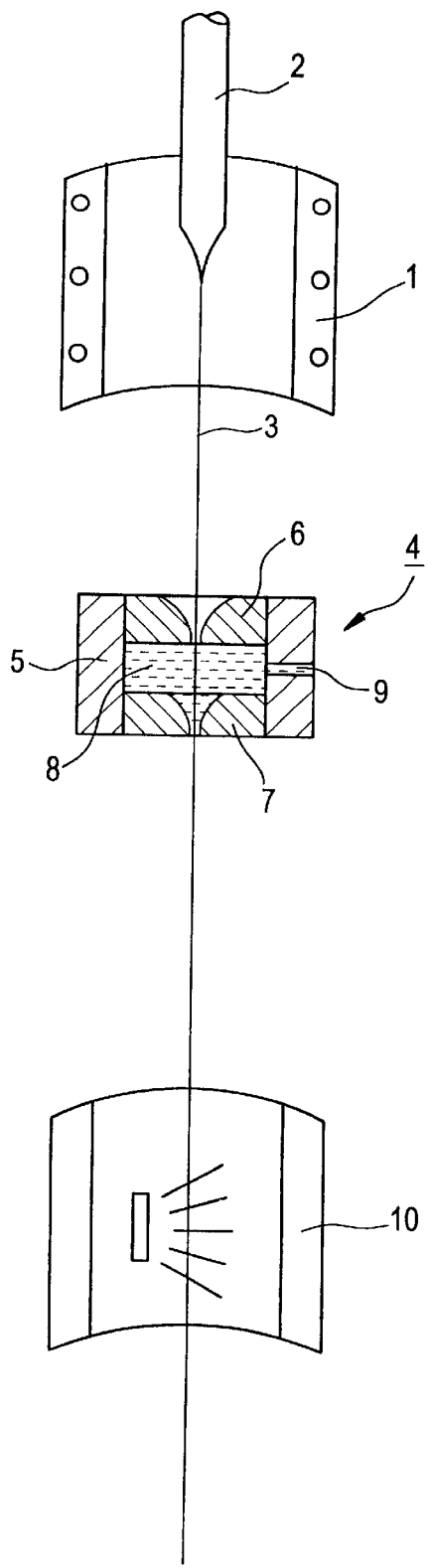

Optical fiber 3 is drawn from preform 2 heated in oven 1. For coating, fiber 3 runs into the coating apparatus 4, which is located below oven 1. The coating apparatus 4 comprises an enclosure 5 with an intake nozzle 6 and an outlet nozzle 7. Between intake nozzle 6 and outlet nozzle 7 is the coating chamber 8 which is supplied with the coating material through inlet opening 9.

The coating material is an UV curable polymer material that is present in coating chamber 8 in liquid form. The preferred material is an acrylate-based resin.

Below coating apparatus 4, there is an UV source 10, which ensures curing of the coating.

The diameter of the bore (not further defined) of intake nozzle 6 is slightly larger than the diameter of fiber 3 so that fiber 3 is concentrically guided to the bore (not further defined) of outlet nozzle 7.

Fiber 3 passing through coating apparatus 4 at high speed is wetted with the coating material in coating chamber 8. The diameter of the bore of outlet nozzle 7 determines the outside diameter of the coating.

Between coating apparatus 4 and UV source 10 a protective gas zone (not depicted) may be provided.

Figure 2:
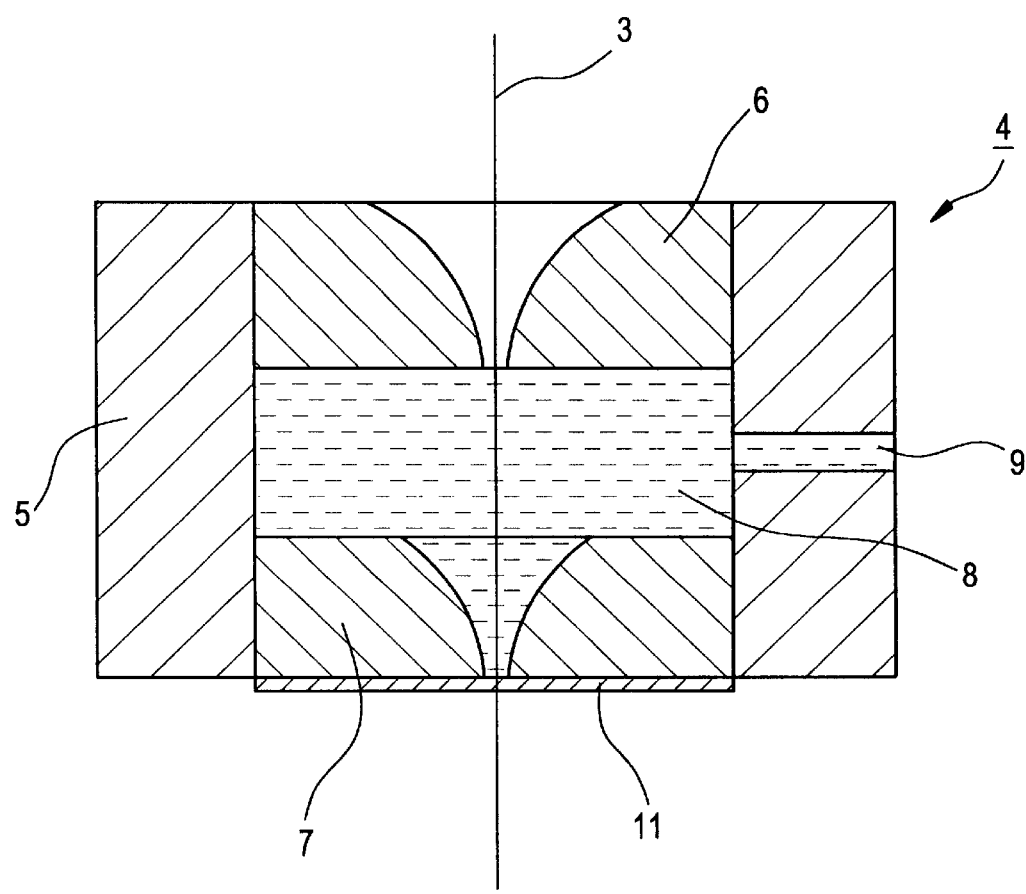

FIG. 2 shows an enlargement of coating apparatus 4.

To prevent the coating material from adhering to the end face on the outlet side of outlet nozzle 7, which is typically made of hard metal, and to prevent it from being uncontrollably carried along by Fiber 3 and thus causing diameter fluctuations in the coating, the outlet-side end face of outlet nozzle 7 is provided with a coating 11 of a material to which the coating material for fiber 3 does not adhere. The thickness of coating 11 can be extremely thin and typically measures between 0.5 and 10 $\mu$m. Silicon and fluorine-containing polymers have been found to be particularly suitable materials for this coating. Silicon is applied to the end face in the form of a silicon varnish or as silicon oil. But particularly advantageous is a coating 11 of polytetrafluoroethylene, which is sintered onto the end face. Such a coating is resistant against thermal and mechanical influences.

What is claimed is:

1. Apparatus for coating an optical fiber with a coating of UV curable polymers comprising a coating chamber with an intake nozzle and an outlet nozzle for applying the coating to the optical fiber as well as a UV source disposed behind the outlet nozzle, characterized in that the end face of outlet nozzle (7) facing the UV source (10) is coated with a material (11) that is antiadhesive with respect to the coating material.

2. Apparatus according to claim 1, characterized in that the antiadhesive material (11) is silicon or silicon oil.

3. Apparatus according to claim 1, characterized in that the antiadhesive material (11) is a fluorine-containing polymer.

4. Apparatus according to claim 3, characterized in that the fluorine-containing polymer is polytetrafluoroethylene.

5. Apparatus according to claim 1, characterized in that the coating thickness of the antiadhesive material (11) is between 0.5 and 10 $\mu$m.

* * * * *